S. Smith.
Stump and Rock Lifter.
No. 98,642.   Patented Jan. 4, 1870.
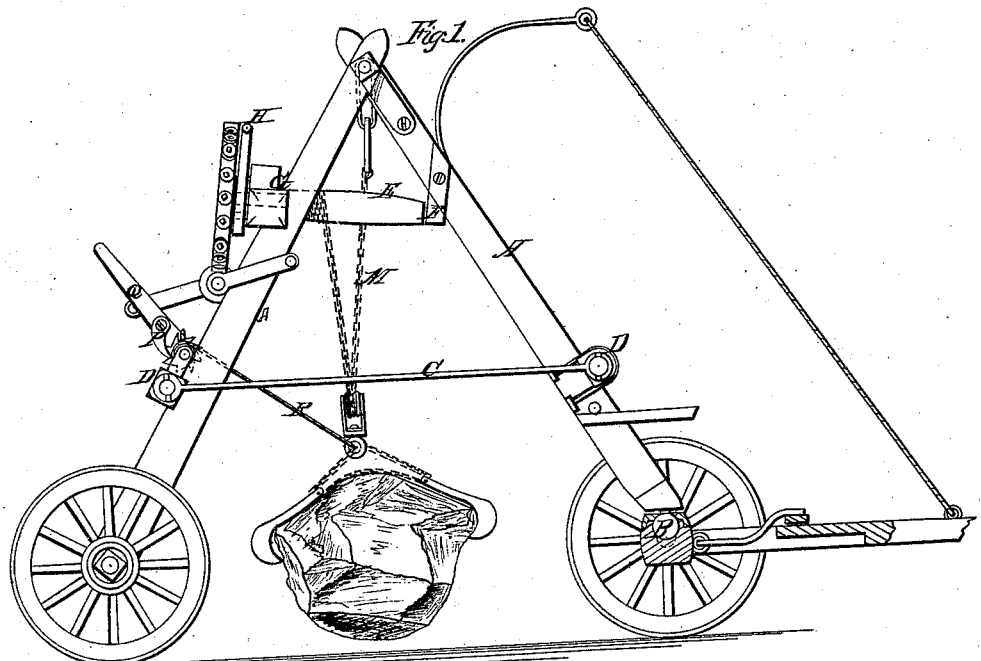
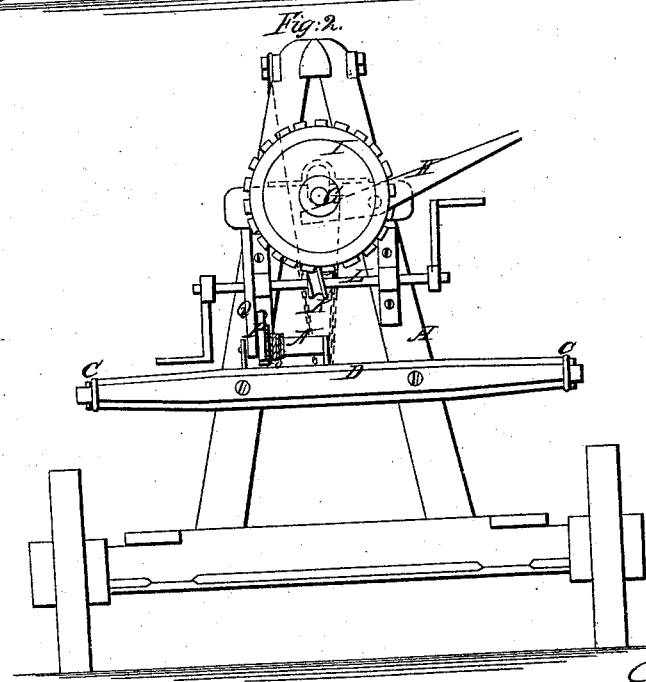
Witnesses  
Inventor  
Silas Smith  
per Munn & Co  
Attorneys

UNITED STATES PATENT OFFICE.

SILAS SMITH, OF WEST STOCKHOLM, NEW YORK.

IMPROVEMENT IN STUMP-EXTRACTORS AND ROCK-LIFTERS.

Specification forming part of Letters Patent No. 98,642, dated January 4, 1870.

*To all whom it may concern:*

Be it known that I, SILAS SMITH, of West Stockholm, in the county of St. Lawrence and State of New York, have invented a new and Improved Stump and Rock Lifter; and I do hereby declare that the following is a full, clear, and exact description thereof, which will enable others skilled in the art to make and use the same, reference being had to the accompanying drawings, forming part of this specification.

This invention relates to improvements in machines for raising rock, stumps, and other heavy bodies, and consists in an improved arrangement of shear-frame and drum operating apparatus on a truck, as herein specified.

Figure 1 represents a side elevation of my improved machine, and Fig. 2 represents an end elevation of the same.

Similar letters of reference indicate corresponding parts.

A represents a strong shear or ʌ-shaped frame, composed of two rear and one front shafts. The rear shafts are rigidly connected to the rear axle, and the front one is connected to the front axle by a ball-and-socket joint, as shown at B, to permit the necessary movements of the front axle in moving over the uneven ground. The front and rear shafts are connected together at the top, and below are the reach-rods C, detachably connected to the ends of the strong transverse beams D, extended laterally, to provide ample room between the rods for large stones or stumps, when elevated by the chain. E represents the winding-drum, supported in the bearing F on the front shaft, and G on the others. In the latter it is movable vertically, and a lever, H, is arranged under the drum, at the side of this bearing, for raising it. On this movable end of the drum is a disk, I, with worm-teeth or friction rollers on the periphery, to be worked by a worm, K, on the hand crank-shaft L. M is the hoisting-chain, made fast at one end to the top of the shear-frame, and at the other end on the drum E. N is a small winding drum arranged on the rear of the shear-frame, and provided with a ratchet, O, pawl P, and hand-lever Q. This drum operates a cord, R, to be connected to the chain or hooks above the weight, for drawing and holding the same at one side from the vertical line, to prevent it from swinging when the truck is moving over the ground. The reach-bars C may be readily detached when the machine is to be placed by the side of a tree for raising it, or any weight higher, than the said reach-rods.

The hoisting-chain is fixed to the shear-frame at one side, and the part which winds on the drum may be wound on in raising the weight from the side next the part attached to the frame, so that when placed alongside of a tree, and the chain is hitched thereto, the trunk of the tree may be pitched or inclined away from the frame in such a way that it may be raised without any material interference of the top of the frame with the trunk of the tree.

By this arrangement the machine is well adapted, also, for raising and moving trees for transplanting. The disk I is raised out of gear with the worm to allow the chains and hooks to be lowered quickly, or to raise them when too low down by turning the drum by hand.

The worm-gears are pitched so high that a heavy weight suspended on the chain will, when the crank is left free, turn the drum backward for discharging.

Having thus described my invention, I claim as new and desire to secure by Letters Patent—

1. The front shaft A, arranged with relation to the rear portion of the frame and front axle, and connected therewith, as shown and described, for the purpose specified.

2. The transverse beam D, having its ends extended beyond the frame on each side, and having the reach-rods C C detachably connected therewith, and with the front shaft, all arranged as shown and described, for the purpose specified.

3. The combination, with the shear-frame, of the winding-drum E, driving-wheel I, worm-gear K, and crank-shaft L, substantially as specified.

4. The combination, with the elevating-chain, of the cord R, winding-drum N, pawl P, ratchet O, and hand-lever Q, all arranged substantially as specified.

SILAS SMITH.

Witnesses:
S. C. CRANE,
C. E. TURNER.